No. 731,489. PATENTED JUNE 23, 1903.
W. P. MORROW.
HARNESS SNAP.
APPLICATION FILED AUG. 28, 1902.
NO MODEL.
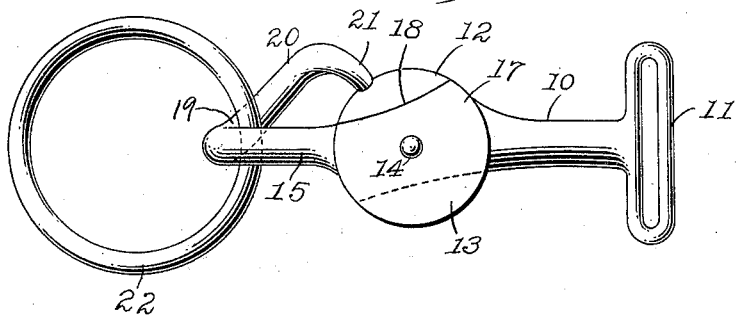
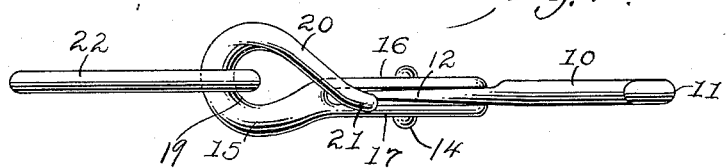
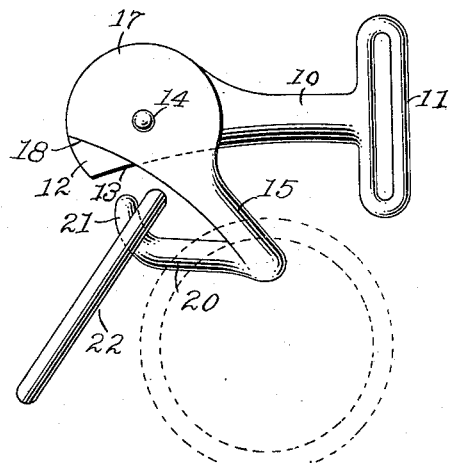

No. 731,489. Patented June 23, 1903.

UNITED STATES PATENT OFFICE.

WILLIAM P. MORROW, OF WOODWARD, OKLAHOMA TERRITORY.

HARNESS-SNAP.

SPECIFICATION forming part of Letters Patent No. 731,489, dated June 23, 1903.

Application filed August 28, 1902. Serial No. 121,387. (No model.)

*To all whom it may concern:*

Be it known that I, WILLIAM P. MORROW, a citizen of the United States, residing at Woodward, in the county of Woodward and Territory of Oklahoma, have invented a new and useful Harness-Snap, of which the following is a specification.

This invention relates to snap-hooks for use more particularly in connection with harness, and has for its object the production of a simply-constructed, durable, easily-operated device which will hold the bearing-ring in alinement with the draft means in position to be irremovable unless the hook be placed in an unusual position and the ring reversed; and the invention consists in the arrangement of parts and the construction, as hereinafter shown and described, and specified in the claims.

In the drawings illustrative of the invention, Figure 1 is a side view of the device complete, and Fig. 2 is a plan view of the same in operative position. Fig. 3 is a side elevation with the device arranged in position for the removal of the bearing-ring.

The improved device consists in a shank or stock 10, having a strap-loop 11 at one end and a mutilated disk 12 at the other end, the mutilated portion (represented at 13) preferably placed at the lower part of the disk, as shown.

Concentrically connected by a pivot 14 to the disk 12 is a forked hook member 15, the hook member shown with the forked portion 16 17 in Fig. 2 embracing opposite sides of the disk, the forked portions preferably conforming in outlines to the disk 12, with one side 18 cut away, as indicated.

The hook member 15 extends forwardly and is curved transversely at right angles to the strap-loop 11 to form a depression 19 to receive a bearing-ring, said depression being of a depth sufficient to hold the ring in alinement with the strap-loop 11, and it is then bent upon itself and carried upwardly and extended obliquely toward the rear, as at 20, and thence downwardly and laterally and terminates at 21, adjacent to the disk 12 and in the same plane therewith, the point being spaced away from the cut-out portion 18 of the hook member, as shown.

The bearing-ring is indicated at 22 and will be of any desired size and may be circular or flat or any other desired shape. The bearing-ring member may be one of the links of a chain, or a metal ring or loop in a harness-strap, or any other suitable device adapted to be engaged by the hook member, and whatever device is employed or supported by the hook member will be necessarily supported by the form of the hook member in alinement with the strap-loop 11, and this feature is an important one and adds materially to the efficiency of the device, as when two straps are united by the loop 11 and the ring 22 the straps will be held in alinement. This is an important consideration and adds materially to the effectiveness and convenience of the device, as will be obvious. By this simple means the bearing-ring will be immovable from the hook member unless the latter be placed in the very unusual position indicated in Fig. 3 and the ring 22 removable then only by turning it one-half around, as indicated in full lines in Fig. 3, a position it would never assume while in operation or by accident as the hook member is loosely pivoted to the disk 12, and in all of the positions of the hook member the ring falls into the depression formed at 19.

If while in use the two straps or other draft means connected by the snap-hook were loosened up and the snap-hook shaken about or violently agitated, the chances for displacement of the bearing-ring by its getting into the position indicated by full lines in Fig. 3 would be so extremely remote as to warrant the claim that a snap-hook constructed as herein illustrated would be practically dissoverable by natural means while in operation or when the parts are slack or disarranged.

The device is extremely simple and cheaply constructed, consisting of only two parts besides the rivet 14, and may be manufactured of any suitable material and in various sizes and proportions to adapt it to the various purposes for which it may be employed.

The device may be modified in minor particulars without departing from the principle of the invention or sacrificing any of its advantages.

Having thus described the invention, what is claimed is—

1. A snap-hook comprising a rear draft member terminating in a mutilated disk, a forward draft member movably connected concentrically to said disk and having a hook extending therefrom, said hook being curved transversely to form a depression and then bent upwardly and rearwardly and terminating adjacent to said disk with the end thereof lying in the same plane as the disk and adapted to support a bearing loop or ring.

2. A snap-hook comprising a rear draft member terminating in a mutilated disk at one end and a strap-loop at the other, a forward draft member movably connected concentrically to said disk and having a hook member extending forwardly therefrom and curved transversely at right angles to the strap-loop to form a depression, then bent upon itself and carried upwardly and extended obliquely toward the rear, and thence downwardly and laterally and terminating adjacent to the disk and in the same plane therewith.

In testimony that I claim the foregoing as my own I have hereto affixed my signature in the presence of two witnesses.

WILLIAM P. MORROW.

Witnesses:
L. H. PATTON,
A. W. ANDERSON.